United States Patent [19]

Englander et al.

[11] Patent Number: 5,762,248
[45] Date of Patent: Jun. 9, 1998

[54] BICYCLE CARRIER

[75] Inventors: Curt Englander, Hillerstorp, Sweden; Raymond R. Raaber, Woodbury, Conn.

[73] Assignee: Industri AB Thule, Hillerstorp, Sweden

[21] Appl. No.: 406,980

[22] PCT Filed: Aug. 15, 1994

[86] PCT No.: PCT/SE94/00738

§ 371 Date: Nov. 20, 1995

§ 102(e) Date: Nov. 20, 1995

[87] PCT Pub. No.: WO95/07197

PCT Pub. Date: Mar. 16, 1995

[30] Foreign Application Priority Data

Sep. 7, 1993 [SE] Sweden ............... 9302881

[51] Int. Cl.⁶ .................. B60R 9/00; B60R 9/048
[52] U.S. Cl. .................. 224/324; 224/315; 224/570; 269/236
[58] Field of Search .................. 224/323, 324, 224/924, 309, 310, 315, 322, 326, 567, 570; 211/17, 22; 269/228, 229, 236

[56] References Cited

U.S. PATENT DOCUMENTS

| 3,901,421 | 8/1975 | Kalicki et al. | 224/324 |
| 4,171,077 | 10/1979 | Richard, Jr. | 224/924 |
| 4,629,104 | 12/1986 | Jacquet | 224/324 |
| 4,702,401 | 10/1987 | Graber et al. | 224/324 |
| 4,875,608 | 10/1989 | Graber | 224/924 |
| 5,042,705 | 8/1991 | Johansson | 224/324 |
| 5,203,484 | 4/1993 | Englander | 224/324 |
| 5,435,475 | 7/1995 | Hudson et al. | 224/324 |
| 5,476,201 | 12/1995 | Hall et al. | 224/324 |

FOREIGN PATENT DOCUMENTS

| 0 141 757 | 7/1984 | European Pat. Off. |
| 0 482 650 | 10/1991 | European Pat. Off. |
| 2 430 873 | 7/1978 | France. |
| 3137348 A1 | 8/1982 | Germany. |

Primary Examiner—Charles R. Eloshway
Attorney, Agent, or Firm—Royston, Rayzor, Vickery, Novak & Druce, L.L.P.

[57] ABSTRACT

A bicycle carrier for fixedly retaining a bicycle on a vehicle roof (1) comprises a carrier device fastened to the vehicle roof and having a longitudinally extending support member for the wheels of the bicycle and an upwardly extending arm with a gripping device (8) for gripping a frame tube of the bicycle. The gripping device has two clamping jaws pivotable towards and away from one another and interconnected via a cog arrangement. One of the clamping jaws is connected to a draw bar having its lower and connected to an operating member at the lower end of arm.

11 Claims, 4 Drawing Sheets

BICYCLE CARRIER

TECHNICAL FIELD

The present invention relates to a bicycle carrier for fixedly retaining a bicycle on a vehicle roof and comprising a carrier device fixable on the vehicle and provided with a support member for at least one of the wheels of the bicycle, and an upwardly extending arm or fork with a gripping device at the upper end, the gripping device being designed for fixedly retaining a frame tube or the like included in the frame of the bicycle.

BACKGROUND ART

Bicycle carriers of the type mentioned by way of introduction are previously known in numerous different variations. Bicycle carriers of this type are mounted on so-called load carrier struts which extend transversely across a vehicle roof from side to side and a slight distance above the roof. On the one load strut, a fitting is secured which, in the transverse direction of the vehicle, is of a length of between 20 and 30 cm and which serves for pivotally securing the arm or fork. When in use, the arm or fork is, therefore, pivoted with the gripping device upwards into cooperation with a frame tube included in the bicycle.

The prior art gripping devices have carried various types of clamping mechanisms by means of which the gripping device may be forcibly urged against the frame tube in order to hold this fast reliably. The clamping mechanisms have been of different types such as thumb wheels, eccentric locks and the like, but all have been operated up at the gripping device.

It will be apparent from the foregoing that the height at which the gripping device proper is located is relatively high above the level of the vehicle roof, for which reason it has proved difficult for a person standing on the ground to reach up, simultaneously holding the bicycle in position and securing it in the gripping device.

PROBLEM STRUCTURE

The present invention has for its object to design the bicycle carrier disclosed by way of introduction in such a manner that it is simple and convenient to use, primarily in that the gripping device can be operated from the level of the vehicle roof, i.e. at a level which is readily accessible for most people. The present invention further has for its object to realise a bicycle carrier which is simple and economical in manufacture, which is operationally dependable and which is lockable so as to prevent theft, and which finally also includes the possibility of being fixedly locked on the vehicle.

SOLUTION

The objects forming the basis of the present invention will be attained if the bicycle carrier disclosed by way of introduction is characterized in that the gripping device is openable and lockable under the action of a transfer apparatus, that the transfer apparatus extends to the lower end of the arm or fork and that it is there operable under the action of an operating device.

The present invention is further suitably characterized in that the gripping device includes two clamping jaws disposed for a relative movement towards and away from one another for abutment against the frame tube; that the transfer apparatus is provided with a drawing device such as a cable, a drawbar or the like which, at the upper end, is connected to the one jaw and which, with the lower end, is connected to the operating device.

These characterizing features realise a design and construction in which it is simple, by operating the operating device, to lock in place or alternatively release the bicycle from the gripping device which is located at a hardly accessible and relatively high level.

Further advantages will be attained according to the present invention if the subject matter of the present invention is also given one or more of the characterizing features as set forth in the appended claims.

BRIEF DESCRIPTION OF THE ACCOMPANYING DRAWINGS

The present invention will now be described in greater detail hereinbelow, with particular reference to the accompanying Drawings. In the accompanying Drawings.

DESCRIPTION OF PREFERRED EMBODIMENT

Figure 1:
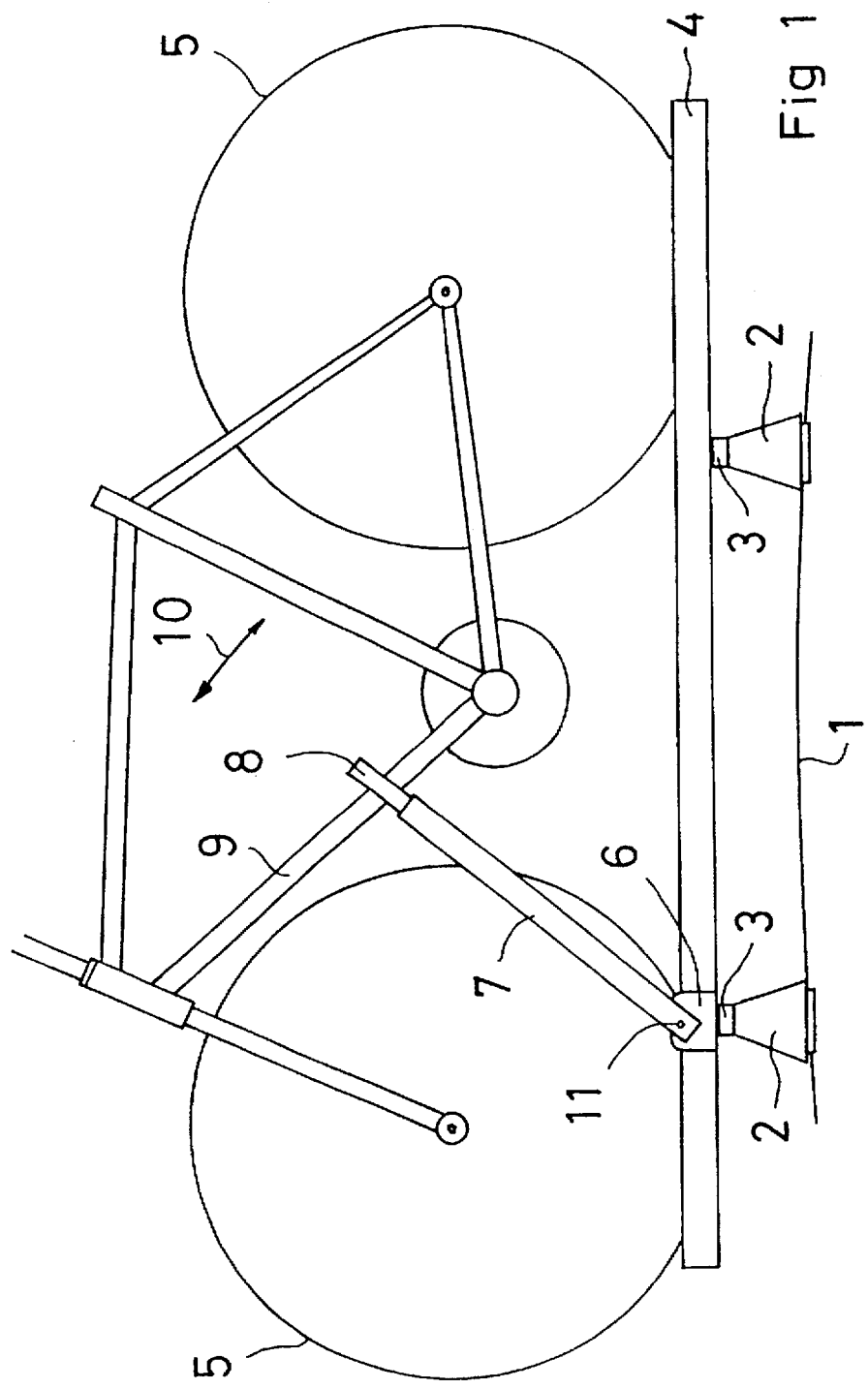
FIG. 1 is a schematic side elevation of a bicycle carrier according to the present invention mounted on a vehicle roof and with a bicycle placed therein.

In FIG. 1, reference numeral 1 refers to the contour of a vehicle roof, and it will be apparent that there is disposed, on the vehicle, a carrier device with feet 2 for mounting on the vehicle roof 1, a load carrier strut 3 extending between the feet at opposing sides of the vehicle roof and transversely over the roof. The two load carrier struts 3 serve for fixedly securing and supporting a longitudinal support member 4 on or in which the wheels 5 of the bicycle rest. The one load carrier strut 3 further serves for supporting and securing an anchorage yoke 6 which, in the longitudinal direction of the load carrier strut 3, extends out on either side of the support member 4. The anchorage yoke 6 serves for anchoring an arm or fork 7 which, at the upper end, is provided with a gripping device 8 for fixedly retaining a frame tube 9 or the like included in the frame of the bicycle.

In the concrete embodiment, the arm or fork 7 is, seen from the front U- or V-shaped and has one leg 12 secured in each end of the anchorage yoke 6 so that the arm 7 is pivotal in accordance with the arrow 10 between a position collapsed along the support member 4 and an upwardly directed position. The pivotal capability is achieved by means of joints 11 between the arm 7 and upstanding anchorage lugs 23 at opposite ends of the anchorage yoke 6.

The support member 4 is in the form of a gutter in which the bicycle wheels 5 may rest and be secured with the aid of clamping straps or the like.

Figure 2:
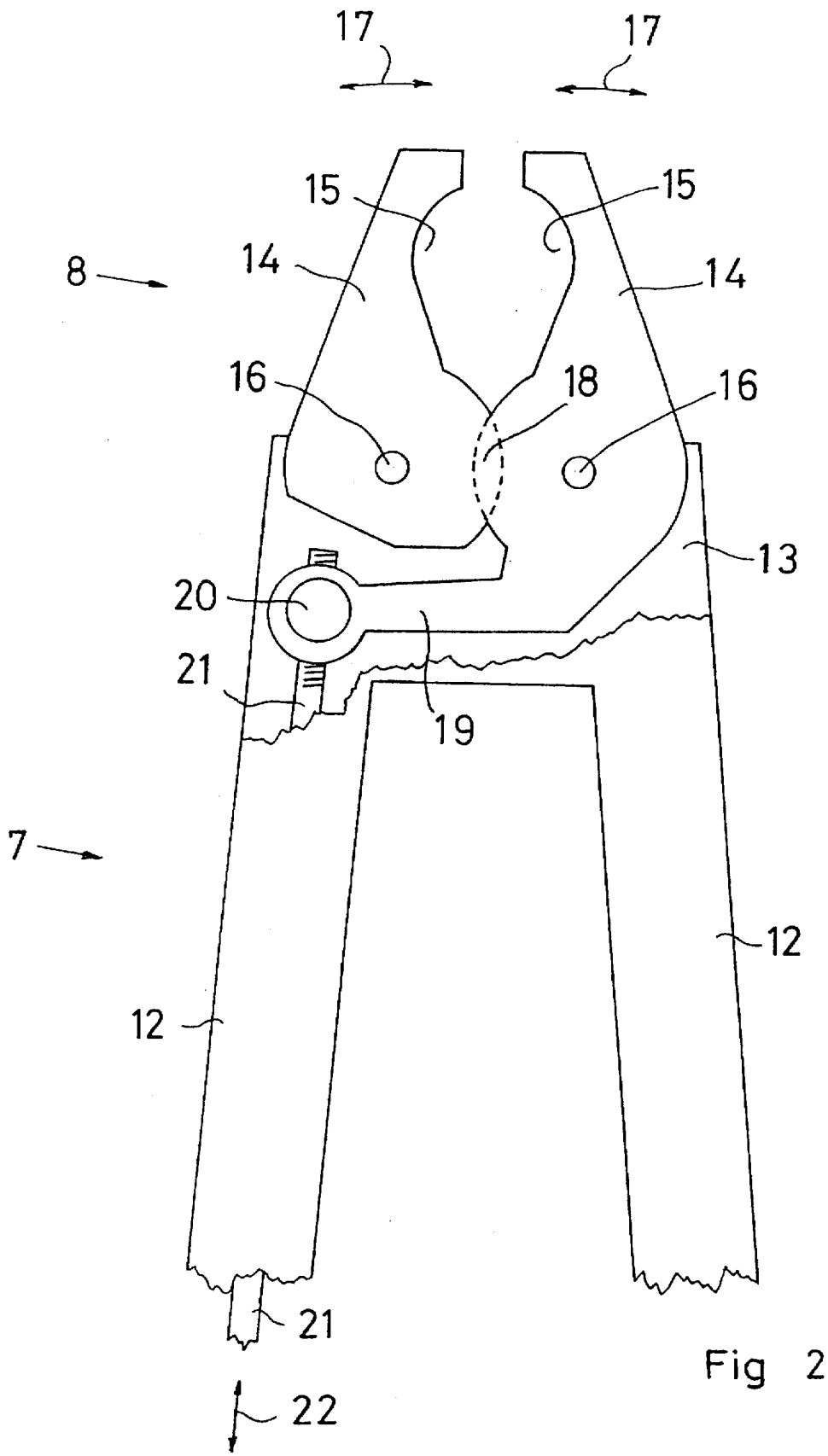
FIG. 2 is a partial view of the upper portion of the bicycle carrier provided with a gripping device for cooperation with a frame tube included in the bicycle frame.

FIG. 2 shows an upper end portion of the arm or fork 7, and it will be apparent that the gripping device 8 is placed at the upper end, and that the arm or fork 7 comprises two tubular legs 12 which are united with one another at the upper end by the intermediary of a crosspiece 13.

The gripping device 8 includes two clamping jaws 14 which are intended to be applied in a positionally fixing manner and to clamp about the frame tube 9 of the bicycle or some other suitable part of the bicycle. The clamping jaws 14 have, in their mutually facing sides, recesses 15 which are intended for accommodating the frame tube 9. The defining walls about the recesses 15 may suitably be fitted with a frictional material, but may also be designed in such a manner that the effective size and configuration of the recesses may be varied in response to the appearance and dimensions of the frame tube 9.

The clamping jaws 14 are disposed in the arm or fork 7 in such a manner that they may execute relative movements towards and away from one another. In the embodiment shown on the Drawing, both of the clamping jaws 14 are pivotally disposed about shafts 16 which are secured in the crosspiece 13. Hereby, the clamping jaws 14 are pivotal towards and away from one another in those directions indicated by the arrows 17, i.e. about the shafts 16. The clamping jaws 14 are motionally interconnected in such manner that they describe synchronous movements towards one another or away from one another. In order to achieve this feature, the clamping jaws are provided with mutually engaging portions 18 which are designed as cog arrangements in which each clamping jaw 14 is provided, along a circle segment within the area 18, with cogs which mesh with corresponding cogs on the other clamping jaw. In that the radii of the cogs about the shafts 16 are equal on both of the clamping jaws, these will move in opposite directions at the same angular speed.

According to the invention, the gripping device 8 is connected to a transfer apparatus which extends along the arm or fork 7 down to its lower end in order there to be coupled to an operating device by means of which the gripping device 8 can be operated via transmission of the transfer apparatus. The operation possibilities include at least two positions in which the one entails that the jaws 14 are pivoted towards one another so that they grasp tightly about and fixedly hold the frame tube 9, and in which the other entails that the jaws 14 are pivoted away from one another so that the frame tube 9 can be moved into or alternatively withdrawn out of the space between the jaws.

As one alternative to the above-described design of the clamping jaws 14, one clamping jaw, suitably the left-hand jaw 14 as viewed in FIG. 2, may be permanently fixed, i.e. secured against pivotal rotation about shaft 16. The right-hand jaw 14, again as viewed in FIG. 2, is thus movable towards and/or away from the fixed, left-hand jaw 14.

As an alternative to the cog arrangement in the engagement portion 18, it is also conceivable to employ linkage mechanisms between the two clamping jaws 14 in which, for example, one such linkage mechanism could comprise a rod which is pivotally secured in the region above the shaft 16 of the right-hand jaw 14 and which extends diagonally down to a pivotal anchorage in the left-hand jaw 14 beneath its shaft 16. Such a design and construction would also impart synchronous movements to the jaws towards and away from one another. In the embodiment illustrated on the Drawings, the transfer apparatus includes a lever 19 projecting from the one clamping jaw 14, the lever having a bore which is parallel with the shafts 16 and which is intended for accommodating a cylindrical pin 20 with a transverse, threaded bore for a drawbar 21. The drawbar extends interiorly in the one leg 12 in the arm or fork 7.

By drawing the drawbar 21 in a direction downwardly according to the arrow 22, the two clamping jaws are pivoted towards one another, while a return movement may be achieved under the action of a return spring (not shown on the Drawing).

Figure 3:
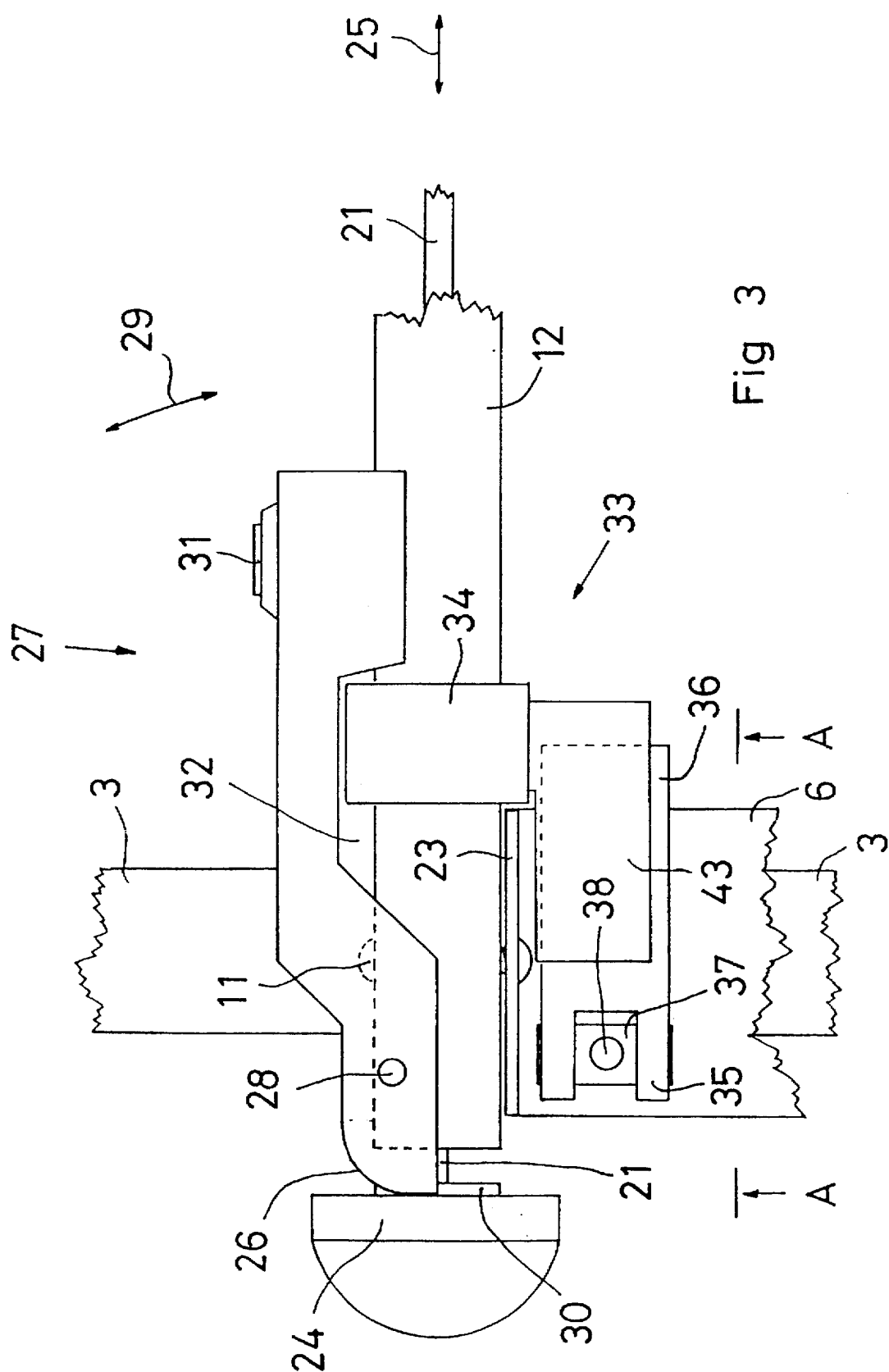
FIG. 3 is a lower partial view of the bicycle carrier of FIG. 1 seen from above and in the locked state.

FIG. 3 shows, from above, the anchorage of the left-hand leg 12 in FIG. 2 in an upwardly directed lug 23 on the one end of the anchorage yoke 6. The Figure shows the leg 12 in a downwardly pivoted position in which it would, in FIG. 1, lie along the support member 4. Further, the Figure shows the carrier in a state in which the gripping device 8 is locked.

It will be apparent from FIG. 3 that the load carrier strut 3 is located beneath the anchorage yoke 6 and that this is provided, in its one end, with an upright anchorage lug 23 which serves, via the joint 11, for fixing the leg 12.

The right-hand leg 12 of the arm 7 in FIG. 2 is provided with a corresponding anchorage in the opposite end of the anchorage yoke 6, those components which are intended for operating and locking of the drawbar 21 being, however, absent. Thus, the opposite end of the anchorage yoke 6 is provided with but a single anchorage lug which corresponds to that illustrated in FIG. 3 and which serves for pivotal anchorage, via a joint, of the right-hand leg 12 in FIG. 2.

It will be apparent from FIG. 3 that the drawbar 21 extends also through the lower end of the leg 12, and that, at the lower end, it extends out in the extension of the leg via a centering element (not shown on the Drawing) disposed at its end. That portion of the drawbar 21 which extends out beyond the lower end of the leg 12 is connected to an operating member 24 projecting out laterally of the longitudinal direction of the drawbar. The arrangement is such that a drawing of the operating member 24 in the longitudinal direction of the leg 12 and in the longitudinal direction of the drawbar 21 displaces the drawbar in the direction of the arrow 25, i.e. imparts an operating movement to the gripping device 8 at the upper end of the arm or fork 7.

For actuating the operating member 24, there is provided a cam surface 26 on an operating handle 27 which is pivotally secured in the leg 12 via a pivot pin 28 and which is shown in FIG. 3 in the locked position. On transfer of the operating handle 27 to the open position, this is pivoted according to the arrow 29 about the pivot pin 28 from the position shown in FIG. 3 in a counterclockwise direction. In this instance, the cam surface 26 will be pivoted so that it permits the operating member 24 to approach the end of the leg 12 so that the drawbar 21 may move upwardly in a direction towards the gripping device 8 under the action of a return spring (not shown). This upward movement of the drawbar 21 entails that the gripping device 8 is opened.

Pivoting of the operating handle 27 from the opened position (not shown) to the locked position according to FIG. 3 will have as a consequence that the cam surface 26 urges the operating member 24 away from the end of the leg 12 so that the drawbar 21 is drawn downwardly and the gripping device 8 is tightened.

In order to make possible adjustment of the size of the recesses 15 in the closed position of the gripping device 8, the upper end of the drawbar 21 is threaded in the transverse pin 20. Thus, the position of the drawbar 21 may be varied in the longitudinal direction by rotation of the operating member 24.

As another alternative to realising the above-mentioned adjustment, a nonadjustable cooperation is conceivable between the drawbar 21 and the lever 19 while, on the other hand, the lower end of the drawbar 21 is threaded and screwed into the operating member 24 so that this will serve the function of an adjustment wheel.

Irrespective of the design and construction which is selected as regards achieving the adjustment possibility, it is essential that the operating member 24 cannot rotate when the operating handle 27 is located in the locked position illustrated in FIG. 3. That friction which may be expected between the operating member 24 and the cam surfaces 26 naturally impedes rotation of the operating portion but does not prevent such rotation.

For this reason, the operating portion is provided, at its end facing the leg 12, with a stop surface or arrest portion 30 which is placed and designed so as to prevent rotation of the operating member with the operating handle 27 in its locked position, in that the arrest portion engages with the cam surface 26.

Figure 4:
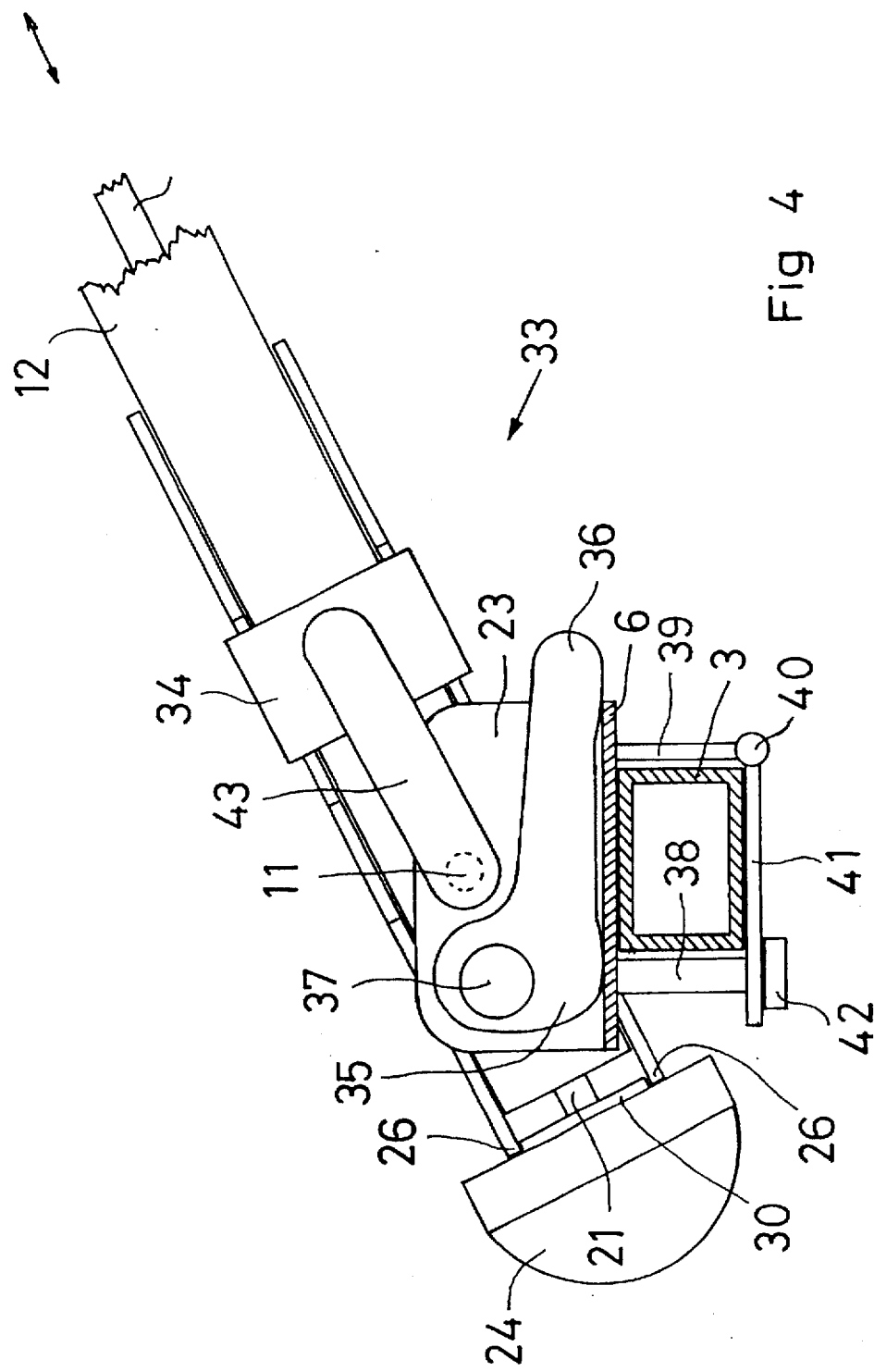
FIG. 4 is a vertical section through the bicycle carrier taken along the section line A—A in FIG. 3.

It will be apparent from FIGS. 3 and 4 taken together that the operating handle 27 has one cam surface 26 on the upper side and one cam surface 26 on the lower side of the leg 12. The rotationally impeding action from the arrest portion 30 is achieved, in such an embodiment, suitably if the arrest portion is of quadratic, hexagonal, octagonal or corresponding nonrotationally symmetric design so that it will have two mutually parallel opposing sides which interiorly can engage between the two cam surfaces 26.

In order to prevent the unauthorized pivoting of the operating handle 27 from the locked position illustrated in FIG. 3, the operating handle is provided, in its outer or upper end, with a locking device 31 by means of which it can be fixedly locked in the leg 12. The detailed design and construction of the locking device are of minor importance to the present invention but may consist of a cylinder lock with a projecting T-shaped locking member which is insertable via a corresponding, oblong aperture in the leg 12 in order thereafter to be twisted to a transversely directed position when the locking device is locked.

For reasons which will be more clearly apparent below, the operating handle 27 is provided, between the locking device 31 and its pivotal securement 28 in the leg 12, with an accommodation space 32 between itself and the leg 12 for accommodating a locking member 33 which is displaceable along the leg 12 and which, with an anchorage portion 34 shiftably extends about the leg 12. The locking member 33 is arranged in such a manner that it is non-rotary about the leg 12 at least in the position illustrated in FIG. 3 where it is accommodated in the accommodation space 32. In order to prevent such rotation, the anchorage portion 34 may be provided with heels which engage with the operating handle 27 so that rotation is thereby prevented, or alternatively the anchorage portion 34 may be provided with an inwardly projecting pin which is guided in a longitudinal groove in the leg 12.

On opening of the operating handle 27, the locking member 33 may be displaced along the tube to a position considerably higher up than that illustrated in FIG. 3, so that it is distanced from the anchorage yoke 6.

For fixedly securing the anchorage yoke 6 on the load carrier strut 3, use is made of an eccentric piece 35 with a projecting operating device 36. The eccentric piece 35 has a bore which extends in the longitudinal direction of the load carrier strut 3 and in which is accommodated a cylindrical pin 37 with a transverse, threaded bore for cooperation with a drag bolt 38. The drag bolt 38 extends on one side of the load carrier strut 3 while a clamp 39 extends on the opposite side and, possibly jointed at 40, has a lower shank 41 on the underside of the load carrier strut 3. The lower shank has an aperture via which the drag bolt 38 may be passed in so that a head 42 on the drag bolt may be located on the underside of the lower shank 41.

As a result of the above-described design and construction, the load carrier strut 3 is enclosed by the anchorage yoke 6, the clamp 39 and the drag bolt 38, and it will readily be perceived that if the drag bolt is drawn upwards, the anchorage yoke 6 will be clamped fast on the load carrier strut 3.

In order to prevent unintentional opening of the operating device 36 so that the drag bolt 38 is released, the above-described locking member 33 is provided with a projecting portion 43 whose end, when the locking member 33 is accommodated in the accommodation space 32 of the handle 27, is located in alignment with the joint shaft 11 for pivotal securement of the arm or fork 7 (i.e. the leg 12) in the anchorage yoke 6. The end being located in this way in the region of the joint shaft, the leg 12 may be pivoted optionally about the joint shaft 11 without any relative displacement taking place between the end of the projecting portion 43 and the anchorage yoke 6 or the eccentric piece 35 disposed thereon. It will also readily be perceived that with this placement of the projecting portion 43, it effectively prevents a pivoting of the operating device 36 in a counter-clockwise direction so that the drag bolt 38 is released.

In order to open the operating device 36, the handle 27 must first be opened, whereafter the locking member 33 must be shifted upwardly along the leg 12 until the projecting portion 43 leaves the area or range of movement of the operating device 36.

While not being apparent from the Drawings, the design and construction also suitably includes means which prevent unintentional rotation of the drag bolt 38 when the eccentric piece 35 is located in its locked position.

DESCRIPTION OF ALTERNATIVE EMBODIMENTS

In the foregoing, the arrest portion 30 has been described as a quadratic or non-rotationally symmetrical projection which is disposed on the operating member 24 and directed towards the leg 12 and which may be accommodated between the cam surfaces 26 in order thereby to prevent rotation of the operating member. Alternatively, it is possible to provide, in the surface of the operating portion 24 facing the leg, at least one groove for each cam surface 26, so that, in the locked state, the cam surface is accommodated in the groove and prevents rotation of the operating portion.

In order to attain a possibility for automatic adjustment of the setting of the gripping device 8 in response to the size of the frame tube 9, the end surface of the operating member 24 facing the leg 12 and the end closure thereof may be provided with mutually engaging recesses and projections. This entails that, when the operating member 24 is tightened and the clamping jaws 14 abut against the frame tube, the operating member 24 will approach the end closure. When contact has subsequently been established between the projections and the recesses, further rotation (inward screwing) of the operating member 24 will be prevented, the operating member being then located close to the end closure, with the jaws 14 in abutment against the frame tube. By a suitable dimensioning and design of the projections and the recesses, it is possible, in this state, to realise a correct starting position for the locking movement of the cam surfaces 26, so that finely adapted clamping of the frame tube 9 is achieved after pivoting of the handle 27 to the locking position.

According to the invention, it is possible to exclude the lockable handle 27 and instead cause the locking function to be achieved in such a manner that the operating member 24 is a threaded, lockable wheel which on being tightened draws the drawbar 21 downwardly and which, in the tightened position, can either be locked by means of a key lock or be disengaged from the thread.

As an alternative to the drawbar 21, a cable or wire is conceivable. Alternatively, one cable may be employed for each of the clamping jaws 14, in which event these cables are secured in each respective clamping jaw in such a manner that, on drawing, they impart the sought-for counter-directed movements to the jaws. In this embodiment, the cog arrangement in the portion 18 may possibly be dispensed with.

Further modifications of the present invention are conceivable without departing from the spirit and scope of the appended Claims.

What is claimed is:

1. A bicycle carrier for fixedly retaining a bicycle on a vehicle roof, and comprising a carrier device fixable on the vehicle roof and provided with a support member for at least one of the wheels of the bicycle, an arm having a lower end connected to said support member and an upper end extending upwardly from said support member and provided with a gripping device at the upper end, the gripping device being designed for fixedly retaining a bicycle frame tube therein wherein the gripping device is operable to grip and lock the tube under the action of a transfer apparatus; said transfer apparatus having one end operably connected to said gripping device and an opposite end extending approximately from the lower end of said arm and an operating device connected between the lower end of said arm and the opposite end of said transfer apparatus, said operating device being movable to tension said transfer apparatus and thereby operates said gripping device.

2. The bicycle carrier as claimed in claim 1, characterized in that the gripping device includes two clamping jaws disposed for a relative movement towards and away from one another for abutment against the frame tube; and that said transfer apparatus has a drawing device which, at the one end, is connected to one jaw and at the opposite end, abuts to operating device.

3. The bicycle carrier as claimed in claim 2, characterized in that the jaws are pivotal towards and away from one another and are motionally interconnected (18) with one another for synchronous movements.

4. The bicycle carrier as claimed in claim 3, characterized in that the interconnection between the jaws includes a cog arrangement.

5. The bicycle carrier as claimed in claim 2, characterized in that the operating device includes an operating handle which is pivotally secured to the arm and which has a cam surface which is located in engagement with an operating member projecting transversely from the drawing device, whereby the drawing device is shiftable by pivoting of the operating handle.

6. The bicycle carrier as claimed in claim 5, characterized in that the position longitudinal of the operating member on the drawing device is adjustable.

7. The bicycle carrier as claimed in claim 6, characterized in that the arm is secured in a carrier portion which, by means of an anchorage portion, is secured on the carrier device.

8. The bicycle carrier as claimed in claim 6, characterized in that the operating member has an arrest surface which, when the operating handle is closed, abuts against the cam surface and prevents rotation of the operating member.

9. The bicycle carrier as claimed in claim 6, characterized in that the operating handle is provided with a locking device by means of which it is fixedly lockable to the arm.

10. The bicycle carrier as claimed in claim 5, characterized in that the operating member has an arrest surface which, when the operating handle is closed, abuts against the cam surface and prevents rotation of the operating member.

11. The bicycle carrier as claimed in claim 5, characterized in that the operating handle is provided with a locking device by means of which it is fixedly lockable to the arm.

* * * * *